2,894,949
THERAPEUTIC COMPOSITION

Charles H. Tilford, Cincinnati, Ohio, Frederick J. McCarty, Ann Arbor, Mich., and Marcus G. Van Campen, Jr., Berkeley, Calif., assignors to The Wm. S. Merrell Company No Drawing. Application January 6, 1958
Serial No. 707,445

6 Claims. (Cl. 260—244)

This invention relates to new chemical compounds which are useful as stimulants or depressants for the central nervous system.

The new compounds include (a) saturated, substituted oxazolopyridines of the formula

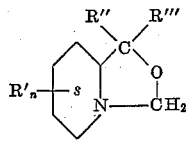

(b) saturated substituted 3-oxa-5-azabicyclo [3.1.3] nonanes of the formula

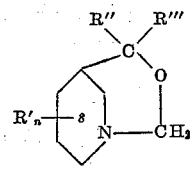

and (c) saturated substituted 3-oxa-5-azabicyclo [3.2.2] nonanes of the formula

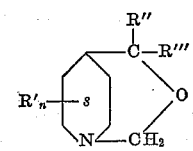

in which $s$ signifies saturation of the rings, $n$ is an integer from 1 to 4 inclusive, $R'$ represents a hydrogen atom or a methyl or ethyl radical, and $R''$ and $R'''$ represent substituents selected from the group consisting of the phenyl, phenyl lower alkyl, lower alkylphenyl, lower alkoxyphenyl, halophenyl and thienyl radicals, and in which $R''$ and $R'''$ when taken together with the carbon atom to which they are attached represent a 9(10)-anthranylidene radical.

More specifically, the radicals represented by $R''$ and $R'''$ include lower alkylphenyl and lower alkoxyphenyl radicals in which the one or more alkyl or alkoxy side chains each contain from 1 to 4 or more carbon atoms, phenyl lower alkyl radicals having a phenyl nucleus attached to an alkyl chain of 1 to 4 or more carbon atoms, e.g., benzyl, phenetyl and the like, and halophenyl radicals in which the phenyl nucleus is substituted with one or more fluorine, chlorine, bromine or iodine atoms in the ortho, meta or para positions.

The new compounds are basic, and are ordinarily used in the form of the acid addition salts such as the hydrochloride, hydrobromide, sulfate, succinate, phosphate, glycolate, acetate, tartrate, levulinate, maleate, and the like. The hydrochloride salts, however, have a tendency to hydrolyze to the corresponding piperidinemethanols and, therefore, the maleate salts, which do not hydrolyze, are preferred. The new compounds can be administered orally in tablet or other suitable form or parenterally, e.g., intravenously.

The new compounds can be used orally and parenterally in doses ranging between about 25 mg. and 200 mg. daily.

The new compounds, in general, affect the central nervous system by stimulation or depression in milder dosages or by convulsion in larger dosages. The usefulness of these compounds, in many cases, however, lies in the variations in mood which they produce rather than in measurable stimulation or depression, e.g., some of the compounds may cause dogs to become very amenable to command and people less bothered by worries and external annoyances.

The new compounds are prepared by reacting the appropriate piperidinemethanol with formaldehyde in an inert solvent at an elevated temperature, usually under reflux conditions. The oxazolopyridines are derived from 2-piperidinemethanols, the 3-oxa-5-azabicyclo [3.1.3] nonanes from 3-piperidinemethanols and the 3-oxa-5-azabicyclo [3.2.2] nonanes from 4-piperidinemethanols.

The piperidinemethanols used as reactants in the preparation of the compounds of this invention are described in United States Patent 2,624,739; in our copending application Ser. No. 462,122, filed October 13, 1954, now abandoned; in application Serial No. 417,956, filed March 22, 1954, now abandoned, of Schumann et al., now abandoned; and in copending application Serial No. 487,464, filed February 10, 1955, now abandoned, of Tilford et al. These piperidinemethanols can be represented by the generic formula

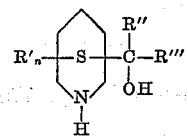

in which $S$, $n$, $R'$, $R''$, and $R'''$ have the same significance as above and the radical

is attached at the 2-, 3-, or 4-position of the piperidine ring. These intermediates are prepared by the reduction of the corresponding pyridinemethanols or their hydrochlorides by standard hydrogenation procedures e.g., with a platinum oxide catalyst. The substituted pyridinemethanols can be obtained by a number of methods some of which are illustrated below by chemical equations. Methods A to F produce α,α-disubstituted pyridinemethanols while Methods G and H produce the corresponding piperidinemethanols directly.

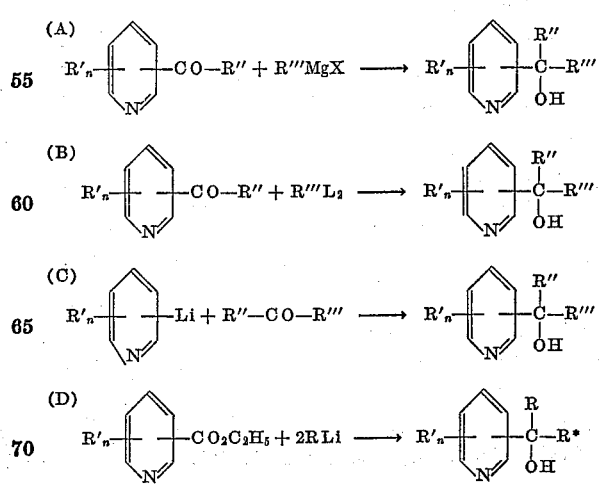

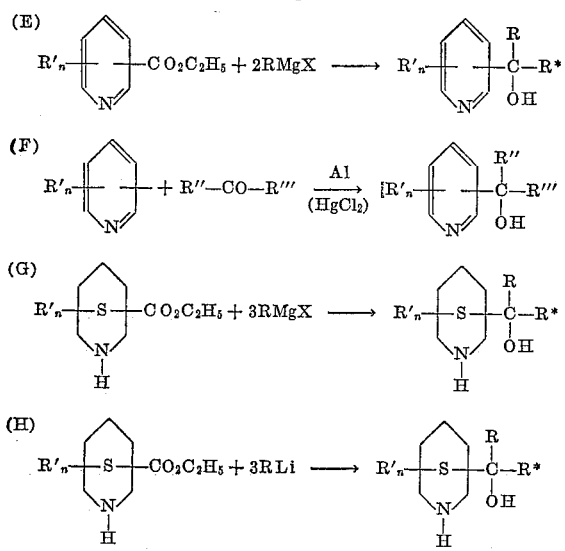

* R is used to represent radicals R″ and R‴ which in these instances are identical.

Examples 1 to 11 below illustrate the preparation of representative intermediate piperidinemethanols which can be converted to the compounds of this invention by reaction with formaldehyde according to the procedures described in Examples 12 to 27. It is to be understood, however, that these specific examples are for illustration only and are not to be construed as limiting the scope of the invention.

EXAMPLE 1

*Alpha-phenyl-alpha-benzyl-2-piperidinemethanol·HCl*

Method A was used to prepare alpha-phenyl-alpha-benzyl-2-pyridinemethanol as follows:

To the Grignard reagent prepared from 126 g. (1 mole) of benzyl chloride, 29 g. (1.2 mole) of magnesium turnings and 500 ml. of dry ether was added 166 g. (0.9 mole) of 2-benzoylpyridine in 150 ml. of dry ether at about −20° C. over a period of 30 minutes with stirring. The mixture was allowed to warm up to 25–30° C. and decomposed with ammonium chloride solution. The mixture was filtered and the precipitate was washed with water; yield: 160 g. (58%); M.P. 100–101° C. The ether layer from the filtrate was evaporated to one-half volume and diluted with 2 volumes of 70–90° petroleum ether, cooled and filtered; yield: 53 g. (19%) of additional product melting at 101–102° C. An analytical sample melted at 104–105° C.

Analysis.—Calcd. for $C_{19}H_{17}ON$: C, 82.89%; H, 6.23%. Found: C, 82.78%; H, 6.50%.

The hydrochloride, prepared by dissolving the above base in 2-propanol followed by treatment with alcoholic hydrogen chloride, cooling and filtering, melted at 188–190° C. (decomposition).

Analysis.—Calcd. for $C_{19}H_{17}ON \cdot HCl$: C, 73.21%; H, 5.82%. Found: C, 72.85%; H, 5.93%.

A mixture of 41 g. (0.15 mole) of the above base in 275 ml. of methanol was treated with 10–12 ml. of concentrated hydrochloric acid at 0° C.; 0.7 g. of platinum oxide catalyst was added and the mixture was shaken in the presence of hydrogen (initial pressure of 60 lbs.) until the theoretical amount of hydrogen was absorbed. The mixture was filtered and the filtrate was evaporated to a volume of about 100 ml. and 300 ml. of hot ethyl acetate was added. The mixture was cooled and filtered; yield: 33 g. (79%); M.P. 235–236° C. (decomposition).

Analysis.—Calcd. for $C_{19}H_{23}ON \cdot HCl$: C, 71.79%; H, 7.61%. Found: C, 71.44%; H, 7.77%.

The filtrate was concentrated and second and third crops were obtained; the second crop (2.0 g.) melted at 230–234° C. (decomposition); the third crop melting at 269–270° C. was recrystallized twice to yield 2 g. of a second racemate melting at 288–289° C. (decomposition) in 4% yield.

Analysis.—Calcd. for $C_{19}H_{23}ON \cdot HCl$: C, 71.79%; H, 7.61%. Found: C, 72.08%; H, 7.75%.

EXAMPLE 2

*Alpha, alpha-di-(2-thienyl)-2-piperidinemethanol·HCl*

To 14.5 g. (0.6 mole) of magnesium turnings in 250 ml. of dry ether was added over a period of an hour 98 g. (0.6 mole) of 2-bromothiophene in 100 ml. of dry ether with stirring under reflux (Method G). The thienylmagnesium bromide solution thus prepared was cooled to −20° C. during 20–30 minutes' addition of 18 g. (0.115 mole) of ethyl pipecolinate in 50 ml. of dry ether. The mixture was allowed to warm up to 25–30° C. and decomposed with aqueous ammonium chloride solution. The ether solution was separated and concentrated on the steam bath to approximately ½ volume. The concentrate was diluted with 3 volumes of hot petroleum ether, cooled at −12° C overnight, and filtered; yield: 18 g. (56%); M.P. 124–125° C.

Analysis.—Calcd. for $C_{14}H_{17}ONS_2$: C, 60.17%; H, 6.14%; S, 22.94%. Found: C, 60.39%; H, 6.30%, S, 22.88%.

The base was converted to the hydrochloride; M.P. 240–241° C. (decomposition).

Analysis.—Calcd. $C_{14}H_{17}ONS_2 \cdot HCl$: C, 53.24%; H, 5.74%; S, 20.30%. Found: C, 53.16%; H, 5.86%; S, 20.27%.

EXAMPLE 3

*Alpha,alpha-di-(p-phenetyl)-2-piperidinemethanol·HCl*

Method D was followed using 50 g. (0.25 mole) of p-bromophenetole, 3.5 g. (0.5 mole) of lithium and 18.2 g. (0.12 mole) of ethyl picolinate. A yield of 8 g. (19%) of white crystals melting at 93–94° C. was obtained and was alpha,alpha-di-(p-phenetyl)-2-pyridinemethanol.

Analysis.—Calcd. for $C_{22}H_{23}O_3N$: C, 75.63%; H, 6.63%. Found: C, 75.79%; H, 6.61%.

Hydrogenation to the desired alpha,alpha-di-(p-phenetyl)-2-piperidinemethanol·HCl was carried out following the procedure of Example 1, M.P. 219° C.; yield 77%.

Analysis.—Calcd. for $C_{22}H_{29}O_3N \cdot HCl$: C, 67.42%; H, 7.72%. Found: C, 67.52%; H, 7.72%.

EXAMPLE 4

*Alpha-phenyl-alpha-(p-ethylphenyl)-2-piperidinemethanol·HCl*

Alpha-phenyl-alpha - (p - ethylphenyl) - 2 - pyridinemethanol was prepared by Method B (from 2-benzoyl pyridine and a lithium reagent prepared from lithium and p-bromoethylbenzene) and was obtained in 62% yield: M.P. 59–61° C.

Analysis.—Calcd. for $C_{20}H_{19}ON \cdot HCl$: C, 73.72%; H, 6.62%. Found: C, 82.87%; H, 6.58%.

The hydrochloride had a M.P of 156–157° C. (decomposition).

Analysis.—Calcd. for $C_{20}H_{19}ON \cdot HCl$: C, 73.72%; H, 6.19%. Found: C, 73.89%; H, 5.90%.

The pyridine hydrochloride was hydrogenated to give the product which was obtained in two forms: (1) 47% yield: M.P. 323–324° C. (decomposition) and (2) 20% yield; M.P. 271–273° C. (decomposition).

Analysis.—Calcd. for $C_{20}H_{25}ON \cdot HCl$: C, 72.40%; H, 7.90%. Found: (1) C, 71.74%; H, 7.91%; (2) C, 71.70%; H, 7.69%.

EXAMPLE 5

*Alpha-phenyl-alpha-(p-fluorophenyl)-2-piperidinemethanol·HCl*

Alpha-phenyl-alpha - (p - fluorophenyl) - 2 - pyridinemethanol was prepared by Method C (from pyridyllithium and p-fluorobenzophenone) and was obtained in 40% yield: M.P. 83–85° C.

*Analysis.*—Calcd. for $C_{18}H_{14}ONF$: C, 77.40%; H, 5.05%. Found: C, 77.39%; H, 5.10%.

The hydrochloride melted at 187–189° C. (decomposition).

*Analysis.*—Calcd. for $C_{18}H_{14}ONF·HCl$: C, 68.45%; H, 4.79%. Found: C, 68.52%; H, 4.84%.

The hydrochloride was hydrogenated to the corresponding piperidinemethanol·HCl which was obtained in 67% yield: M.P. 288–289° C. (decomposition).

*Analysis.*—Calcd. for $C_{18}H_{20}ONF·HCl$: C, 67.17%; H, 6.26%. Found: C, 67.21%; H, 6.45%.

EXAMPLE 6

*Alpha-phenyl-alpha-(m-chlorophenyl)-2-piperidinemethanol·HCl*

Alpha-phenyl-alpha-(m - chlorophenyl) - 2 - pyridinemethanol was prepared by Method B (from 2-benzoylpyridine and a lithium reagent prepared from n-butyllithium and m-bromochlorobenzene) and was obtained in 24% yield: M.P. 166–176° C. at 10 mm. The hydrochloride had a melting point of 194–196° C. (decomposition).

*Analysis.*—Calcd. for $C_{18}H_{14}ONCl·HCl$: C, 65.07%; H, 4.55%. Found: C, 64.86%; H, 4.76%.

The hydrochloride was hydrogenated to the corresponding piperidinemethanol·HCl which was obtained in 83% yield: M.P. 304–305° C. (decomposition).

*Analysis.*—Calcd. for $C_{18}H_{20}ONCl·HCl$: C, 63.90%; H, 6.26%. Found: C, 63.95%; H, 6.40%.

EXAMPLE 7

*Alpha-phenyl-alpha-(o-chlorophenyl)-2-piperidinemethanol·HCl*

Method C was used to prepare alpha-phenyl-alpha-(o-chlorophenyl)-2-pyridinemethanol·HCl (from o-chlorobenzophenone and pyridyl lithium) which was obtained in 51% yield: M.P. 260–262° C. The corresponding piperidinemethanol was obtained by hydrogenation: yield 79%; M.P. 266–268° C. (decomposition).

*Analysis.*—Calcd. for $C_{18}H_{20}ONCl·HCl$: C, 63.90%; H, 6.26%. Found: C, 63.81%; H, 6.12%.

EXAMPLE 8

*Alpha-phenyl-alpha-(p-bromophenyl)-2-piperidinemethanol·HCl*

Method C was used to prepare alpha-phenyl-alpha-(p-bromophenyl)-2-pyridinemethanol (from p-bromobenzophenone and a lithium reagent prepared from n-butyllithium and 2-bromopyridine) and was obtained in 68% yield: M.P. 96° C.

*Analysis.*—Calcd. for $C_{18}H_{14}ONBr$: C, 63.53%; H, 4.15%. Found: C, 63,52%; H, 4.23%.

The hydrochloride melted at 203–204° C. (decomposition).

*Analysis.*—Calcd. for $C_{18}H_{14}ONBr·HCl$: C, 57.39%; H, 4.01%. Found: C, 57.26%; H, 4.09%.

The hydrochloride was hydrogenated to the corresponding piperidinemethanol·HCl which was obtained in two forms: (1) yield 20%; M.P. 314–315° C. (decomposition) and (2) yield 22%; M.P. 275–276° C. (decomposition).

*Analysis.*—Calcd. for $C_{18}H_{20}ONBr·HCl$: C, 56.48%; H, 5.53%. Found: (1) C, 56.38%; H, 5.59%; (2) C, 56.37%; H, 5.75%.

EXAMPLE 9

*Alpha,alpha-di-(o-tolyl)-2-piperidinemethanol·HCl*

Method D was followed using ethyl picolinate and a lithium reagent prepared from o-bromotoluene and lithium. A yield of 74% of crystals melting at 119–120° C. was obtained and was alpha,alpha-di-(o-tolyl)-2-pyridinemethanol.

*Analysis.*—Calcd. for $C_{20}H_{19}ON$: C, 83.01%; H, 6.62%. Found: C, 83.08%; H, 6.87%.

The hydrochloride was prepared by the procedure of Example 1, M.P. 193–194° C.

*Analysis.*—Calcd. for $C_{20}H_{20}ONCl$: C, 73.72%; H, 6.19%. Found: C, 73.58%; H, 6.18%.

Hydrogenation of the hydrochloride gave the desired alpha,alpha-di-(o-tolyl)-2-piperidinemethanol·HCl. M.P. 255–256° C., yield 92%.

*Analysis.*—Calcd. for $C_{20}H_{26}ONCl$: C, 72.40%; H, 7.90%. Found: C, 72.28%; H, 7.86%.

EXAMPLE 10

*Alpha-phenyl-alpha-(m-tolyl)-2-piperidinemethanol*

Method B was followed using 2-benzoylpyridine and a lithium reagent prepared from lithium and m-bromotoluene. A yield of 86% of crystals melting at 90–91° C. was obtained and was alpha-phenyl-alpha-(m-tolyl)-2-pyridinemethanol.

*Analysis.*—Calcd. for $C_{19}H_{17}ON$: C, 82.89%; H, 6.23%. Found: C, 82.90%; H, 6.42%.

Hydrogenation gave the desired alpha-phenyl-alpha-(m-tolyl)-2-piperidinemethanol.

EXAMPLE 11

*Alpha,alpha-di-(p-tolyl)-4-methyl-2-piperidinemethanol·HCl*

Alpha,alpha - di-(p-tolyl)-4-methyl-2-pyridinemethanol was prepared by the condensation of gamma-picoline with di-p-tolylketone in the presence of aluminum, mercuric chloride and iodine, M.P. 107–109° C., yield 52%.

*Analysis.*—Calcd. for $C_{21}H_{21}ON$: C, 83.14%; H, 6.98%. Found: C, 83.13%; H, 7.07%.

The hydrochloride was prepared by the procedure of Example 1, M.P. 180–183° C.

*Analysis.*—Calcd. for $C_{21}H_{22}ONCl$: C, 74.20%; H, 6.53%. Found: C, 74.28%; H, 6.27%.

Hydrogenation of the hydrochloride gave the desired alpha,alpha - di - (p - tolyl) - 4-methyl-2-piperidinemethanol·HCl, M.P. 303–304° C., 58% yield.

*Analysis.*—Calcd. for $C_{21}H_{28}ONCl$: C, 72.91%; H, 8.16%. Found: C, 72.92%; H. 8.04%.

The following examples illustrate the preparation of the new compounds of our invention.

EXAMPLE 12

*1,1-di-(2-thienyl)-heptahydrooxazolo-[3,4-a] pyridine·HCl*

A mixture of 6 g. (0.019 mole) of alpha,alpha-di-(2-thienyl)-2-piperidinemethanol·HCl, prepared in Example 2 above, 4 ml. (0.05 mole) of formalin and 100 ml. of methanol was refluxed for 16 hours and then evaporated on a steam bath. The residue was dissolved in 120 ml. of ethyl acetate, cooled and filtered; yield: 5 g. (80%); M.P. 208–210° C. (decomposition). An analytical sample melted at 210–212° C. (decomposition).

*Analysis.*—Calcd. for $C_{15}H_{17}ONS_2·HCl$: C, 54.94%; H, 5.53%; S, 19.46%. Found: C, 54.81%; H, 5.61%; S, 19.65%.

This compound exhibits activity as a depressant for the central nervous system.

EXAMPLE 13

*1,1-di-(o-tolyl)-heptahydrooxazolo-[3,4-a]
pyridine·HCl*

The procedure of Example 12 was carried out using 10 g. (0.03 mole) of alpha,alpha-di-(o-tolyl)-2-piperidinemethanol·HCl, prepared in Example 9 above, 8 ml. (0.1 mole) of formalin, and 70 ml. of methanol. The desired product (6 g.; 60%) melted at 224–226° C. (decomposition).

*Analysis.*—Calcd. for $C_{21}H_{25}ON·HCl$: C, 73.36%; H, 7.62%. Found: C, 73.39%; H, 7.65%.

This compound exhibits activity as a depressant for the central nervous system.

EXAMPLE 14

*1,1-diphenyl-heptahydrooxazolo-[3,4-a]
pyridine maleate*

A mixture of 3 g. (0.011 mole) of alpha,alpha-diphenyl-2-piperidinemethanol (Example 1 of U.S. 2,264,739), 1.8 g. (0.22 mole) of formalin and 50 ml. of methanol was refluxed for 16 hours. The reaction mixture was evaporated to one-half volume on a steam bath, cooled, and filtered; yield: 2.8 g. (92%); M.P. 117–121° C.

*Analysis.*—Calcd. for $C_{19}H_{21}ON$: C, 81.69%; H, 7.58%. Found: C, 82.41%; H, 8.19%.

The acid maleate salt was obtained by cooling a solution of 2.8 g. (0.01 mole) of the above base and 1.2 g. (0.01 mole) of maleic acid in methanol-ether; yield: 2 g. (50%); M.P. 158–159° C.

*Analysis.*—Calcd. for $C_{19}H_{21}ON·C_4H_4O_4$: C, 69.86%; H, 6.38%. Found: C, 69.88%; H, 6.73%.

This compound exhibits activity as a stimulant for the central nervous system.

EXAMPLE 15

*1-phenyl-1-(m-tolyl)-heptahydrooxazolo-
[3,4-a]pyridine maleate*

The procedure of Example 14 was carried out using alpha - phenyl - alpha - (m - tolyl) - 2 -piperidinemethanol, prepared in Example 10 above, as the primary reactant. The desired product, obtained as above, had a M.P. of 134–136° C. (decomposition).

*Analysis.*—Calcd. for $C_{20}H_{23}ON·C_4H_4O_4$: C, 70.40%; H, 6.65%. Found: C, 70.55%; H, 6.61%.

This compound exhibits activity as a stimulant for the central nervous system.

EXAMPLE 16

*1-phenyl-1-benzyl-heptahydrooxazolo-
[3,4-a]pyridine maleate*

The procedure of Example 14 was carried out using alpha - phenyl - alpha - benzyl - 2 -piperidinemethanol, prepared in Example 7, as the primary reactant. The desired product, obtained as above had a M.P. of 114–116° C. (hygroscopic; decomposition).

*Analysis.*—Calcd. for $C_{20}H_{23}ON·C_4H_4O_4$: C, 70.40%; H, 6.65%. Found: C, 70.21%; H, 6.74%.

This compound exhibits activity as a stimulant for the central nervous system.

EXAMPLE 17

*1-phenyl-1-(m-chlorophenyl)heptahydrooxazolo-
[3,4-a]pyridine maleate*

The procedure of Example 14 was carried out using alpha - phenyl - alpha - (m - chlorophenyl) - 2 - piperidinemethanol, prepared in Example 6, as the primary reactant. The free base was isolated as above; M.P. 83–85° C.

*Analysis.*—Calcd. for $C_{19}H_{20}ONCl$: C, 72.73%; H, 6.43%. Found: C, 72.92%; H, 6.47%.

The acid maleate salt was obtained as in Example 14; M.P. 126–128° C. (decomposition).

*Analysis.* — Calcd. for $C_{19}H_{20}ONCl·C_4H_4O_4$: C, 64.26%; H, 5.63%. Found: C, 64.21%; H, 5.75%.

This compound exhibits activity as a stimulant for the central nervous system.

EXAMPLE 18

*1,1-di-(p-chlorophenyl)-heptahydrooxazolo-
[3,4-a]pyridine maleate*

The procedure of Example 14 was carried out using alpha-alpha - di - (p - chlorophenyl) - 2 -piperidinemethanol (Compound No. 13(c) of Table I of Serial No. 462,122) as the primary reactant. The free base was isolated as above; M.P. 169–171° C.

*Analysis.*—Calcd. for $C_{19}H_{19}ONCl_2$: C, 65.52%; H, 5.50%. Found: C, 65.32%; H, 5.82%.

The acid maleate salt was obtained as in Example 14; M.P. 132–134° C. (decomposition).

*Analysis.*—Calcd. $C_9H_{19}ONCl_2·C_4H_4O_4$: C, 59.50%; H, 4.99%. Found: C, 59.38%; H, 5.18%.

This compound exhibits activity as a stimulant for the central nervous system.

EXAMPLE 19

*Spiro(anthracene-9[10H],1i-heptahydrooxazolo-
[3,4-a]pyridine) maleate*

The intermediate, 9-(2-piperidyl)-9-anthrol (Compound 31(c) of Table I of Serial No. 462,122), was converted to the desired product by the procedure of Example 14. The free base melted at 162–164° C.

*Analysis.*—Calcd. for $C_{20}H_{21}ON$: C, 82.44%; H, 7.27%. Found: C, 82.29%; H, 7.37%.

The acid maleate melted at 168–169° C. (decomposition).

*Analysis.*—Calcd. for $C_{20}H_{21}ON·C_4H_4O_4$: C, 70.75%; H, 6.18%. Found: C, 70.62%; H, 6.23%.

This compound exhibits activity as a depressant for the central nervous system.

EXAMPLE 20

*1,1-di-(p-tolyl)-1-methyl-heptahydrooxazolo-
[3,4-a]pyridine·HCl*

The intermediate, alpha,alpha-di-(p-tolyl)-4-methyl-2-piperidinemethanol·HCl prepared in Example 11 above, was converted to the desired product by the procedure of Example 12: the hydrochloride melted at 295° C. (decomposition).

*Analysis.*—Calcd. for $C_{22}H_{27}ON·HCl$: C, 73.81%; H, 7.88%. Found: C, 73.97%; H, 8.40%.

EXAMPLE 21

*2-p-chlorophenyl-2-phenyl-3-oxa-5-azabicyclo[3.2.2]-
nonane maleate*

The intermediate, alpha - (p - chlorophenyl) - alpha-phenyl-4-piperidinemethanol (Compound No. 4(c) of Table II of Serial No. 462,122 and Example 1 of Serial No. 487,464) was converted to the desired product by the procedure of Example 14; M.P. of the acid maleate 101–104° C.

*Analysis.*—Calcd. for $C_{23}H_{24}O_5NCl$: C, 64.26%; H, 5.63%. Found: C, 62.77%; H, 6.43%.

Analysis indicates product may have 1 molecule of ethanol of crystallization.

*Analysis.* — Calcd. for $C_{23}H_{24}O_5NCl·C_2H_5OH$: C, 63.10%; H, 6.35%.

EXAMPLE 22

*2-benzyl-2-phenyl-3-oxa-5-azabicyclo[3.2.2]nonane
maleate*

A mixture of 14.3 g. (0.045 mole) of the intermediate alpha - benzyl - alpha - phenyl - 4 - piperidinemethanol·HCl (Compound No. 3(c) of Table II of S.N. 462,122 and Example II of S.N. 487,464), 14 ml. of formalin, 3.7 g. of sodium bicarbonate, and 250 ml. of methanol was refluxed for 16–24 hours. The reaction mixture was diluted with two volumes of water, made alkaline with 2.5 g. of potassium hydroxide, cooled, and filtered. The crude free base was recrystallized from 80% methanol; yield: 11 g. (83%); M.P. 144–146° C.

*Analysis.*—Calcd. for $C_{20}H_{23}ON$: C, 81.86%; H, 7.90%. Found: C, 81.40%; H, 8.37%.

The above desired free base (5.5 g.; 0.0178 mole) was dissolved in 50 ml. of benzene and a solution of 2 g. (0.0178 mole) of maleic acid in 50 ml. of 1:1 benzene-methanol was added. The mixture was cooled and filtered; yield: 4 g. as first crop; M.P. 168–170° C. dec. Recrystallization from methanol-benzene gave the pure desired acid maleate salt melting at 172–174° C. dec.

*Analysis.*—Calcd. for $C_{20}H_{23}ON \cdot C_4H_4O_4$: C, 70.40%; H, 6.65%. Found: C, 70.42%; H, 6.90%.

This compound exhibits activity as a depressant for the central nervous system.

EXAMPLE 23

*2-(o-tolyl)-2-phenyl-3-oxa-5-azabicyclo[3.2.2]nonane maleate*

The intermediate alpha - (o - tolyl) - alpha-phenyl - 4-pyridimethanol·HCl was prepared by Method B (from 4-benzoyl pyridine and a lithium reagent prepared from lithium and o-bromotoluene); yield: 75%; M.P. 214–215° C. dec.

*Analysis.*—Calcd. for $C_{19}H_{17}ON \cdot HCl$: C, 73.19%; H, 5.82%. Found: C, 72.96%; H, 5.86%.

It was hydrogenated to the next intermediate, alpha-(o-tolyl)-alpha-phenyl-4-piperidinemethanol·HCl by the procedure of the second part of Example 1; M.P. 256–257° C. dec.

*Analysis.*—Calcd. for $C_{19}H_{23}ON \cdot HCl$: C, 71.79%; H, 7.61%. Found: C. 71.43%; H, 7.47%.

The desired bicyclononane maleate salt was obtained by the procedure of Example 22; M.P. 174–175° C. dec.

*Analysis.*—Calcd. for $C_{20}H_{23}ON \cdot C_4H_4O_4$: C, 70.40%; H, 6.65%. Found: C, 70.25%; H, 6.55%.

This compound exhibits activity as a depressant for the central nervous system.

EXAMPLE 24

*2,2-di-(o-tolyl)-3-oxa-5-azabicyclo[3.2.2]nonane maleate*

The intermediate alpha,alpha-di-(o-tolyl)-4-pyridinemethanol·HCl obtained by Method D (from ethyl isonicotinate and o-lithiotoluene) melted at 208–210° C. dec.

*Analysis.*—Calcd. for $C_{20}H_{19}ON \cdot HCl$: C, 73.72%; H, 6.19%. Found: C, 73.72%; H, 6.26%.

It was hydrogenated by the procedure of Example 1 to the next intermediate, alpha,alpha-di-(o-tolyl)-4-piperidinemethanol·HCl; M.P. 305–306° C. dec.

*Analysis.*—Calcd. for $C_{20}H_{25}ON \cdot HCl$: C, 72.40%; H, 7.90%. Found: C, 72.27%; H, 8.02%.

The desired bicyclononane acid maleate salt was obtained by the procedure in Example 22; M.P. 190–191° C. dec.

*Analysis.*—Calcd. for $C_{21}H_{25}ON \cdot C_4H_4O_4$: C, 70.91%; H, 6.90%. Found: C, 70.68%; H, 7.27%.

This compound exhibits activity as a depressant for the central nervous system.

EXAMPLE 25

*2-(o-methylbenzyl)-2-phenyl-3-oxa-5-azabicyclo[3.2.2]nonane maleate*

The intermediate alpha - (o - methylbenzyl) - alpha-phenyl-4-pyridinemethanol·HCl was obtained using Method A (from 4-benzoyl pyridine and a reagent prepared from magnesium and o-methylbenzylchloride); M.P. 234–236° C. dec.

*Analysis.*—Calcd. for $C_{20}H_{19}ON \cdot HCl$: C, 73.72%; H, 6.19%. Found: C, 73.42%; H, 6.25%.

The next intermediate, alpha-(o-methylbenzyl)-alpha-phenyl-4-piperidinemethanol·HCl was obtained by the hydrogenation procedure of Example 1; M.P. 245–246° C. dec.

*Analysis.*—Calcd. for $C_{20}H_{25}ON \cdot HCl$: C, 72.40%; H, 7.90%. Found: C, 72.39%; H, 7.80%.

The desired bicyclononane acid maleate salt was obtained by the procedure of Example 22; M.P. 197–198° C. dec.

*Analysis.*—Calcd. for $C_{21}H_{25}ON \cdot C_4H_4O_4$: C, 70.91%; H, 6.90%. Found: C. 71.09%; H, 7.09%.

This compound exhibits activity as a depressant for the central nervous system.

EXAMPLE 26

*2-(o-tolyl)-2-benzyl-3-oxa-5-azabicyclo[3.2.2]nonane maleate*

The intermediate alpha - (o - tolyl) - alpha-benzyl-4-pyridinemethanol·HCl was obtained by the procedure of Method A using 4-(o-tolyl)pyridyl ketone (from 4-cyanopyridine and o-tolyllithium); new compound M.P. 40–41° C.

*Analysis.*—Calcd. for $C_{13}H_{11}ON$: C, 79.18%; H, 5.62%; N, 7.10%. Found: C, 79.20%; H, 5.62%; N, 7.25%.

M.P. 244–246° C. dec.

*Analysis.*—Calcd. for $C_{20}H_{19}ON \cdot HCl$: C, 73.72%; H, 6.19%. Found: C, 74.10%; H, 6.23%.

The next intermediate, alpha(o-tolyl)-alpha-benzyl-4-piperidinemethanol·HCl was obtained by the hydrogenation procedure of Example 1; M.P. 255–257° C.

*Analysis.*—Calcd. for $C_{20}H_{25}ON \cdot HCl$: C, 72.40%; H, 7.90%. Found: C. 72.51%; H, 8.03%.

The desired bicyclononane acid maleate salt was prepared by the procedure of Example 22; M.P. 167–169° C.

*Analysis.*—Calcd. for $C_{21}H_{25}ON \cdot C_4H_4O_4$: C, 70.91%; H, 6.90%. Found: C, 70.95%; H, 7.13%.

This compound exhibits activity as a depressant for the central nervous system.

EXAMPLE 27

*2,2-diphenyl-3-oxa-5-azabicyclo[3.1.3]-nonane maleate*

The intermediate, alpha-alpha-diphenyl-3-piperidinemethanol (Example 23 of Serial No. 462,122), was converted to the desired product by the procedure of Example 14. The free base melted at 118–121° C.

*Analysis.*—Calcd. for $C_{19}H_{21}ON$: C, 81.69%; H, 7.58%. Found: C, 81.48%; H, 7.72%.

The acid maleate melted at 202–203° C. (decomposition).

*Analysis.*—Calcd. for $C_{19}H_{21}ON \cdot C_4H_4O_4$: C, 69.86%; H, 6.38%. Found: C, 69.79%; H, 6.43%.

This compound exhibits activity as a depressant for the central nervous system.

Other oxazolopyridines of this invention which are prepared by the procedures of the above examples include:

1,1-di-(o - methoxyphenyl) - heptahydrooxazolo[3,4-a]pyridine
1,1, - di - (p - isopropoxyphenyl) - heptahydrooxazolo[3,4-a]pyridine
1,1-di - (o - [n - butoxy] - phenyl) - heptahydrooxazolo[3,4-a]pyridine
1,1 - di - (m-methoxyphenyl)-heptahydrooxazolo[3,4-a]pyridine
1-phenyl - 1 - methoxyphenyl-heptahydrooxazolo[3,4-a]pyridine
1 - (o - tolyl) - 1 - (o-ethoxyphenyl)-heptahydrooxazolo[3,4-a]pyridine
1,1 - di - (p-isopropylphenyl)-heptahydrooxazolo[3,4-a]pyridine 1,1 - di - (p - isobutylphenyl)-heptahydrooxazolo[3,4-a]pyridine
1,1 - di - (o - ethylphenyl) - heptahydrooxazolo[3,4-a]pyridine
1 - phenyl - 1 - (o-[n-propyl]phenyl)-heptahydrooxazolo[3,4-a]pyridine
1,1-dibenzyl-heptahydrooxazolo[3,4-a]pyridine
1 - phenyl - 1 - (p - fluorophenyl) - heptahydrooxazolo[3,4-a]pyridine
1 - phenyl - 1-(o-iodophenyl)-heptahydrooxazolo[3,4-a]pyridine
1,1 - di - (p - bromophenyl) - heptahydrooxazolo[3,4-a]pyridine
1,1 - di - (2,4-dichlorophenyl)-heptahydrooxazolo[3,4-a]pyridine
1,1 - di - (2,4,6 - trichlorophenyl) - heptahydrooxazolo[3,4-a]pyridine
1,1-di-(p-phenetyl)-heptahydrooxazolo[3,4-a]pyridine
1,1 - di - (2,4 - dimethoxyphenyl) - heptahydrooxazolo[3,4-a]pyridine
1,1 - di - (2 - methoxy - 3-ethoxyphenyl)-heptahydrooxazolo[3,4-a]pyridine
1 - (o - methoxyphenyl) - 1 - (p - isopropoxyphenyl)-heptahydrooxazolo[3,4-a]pyridine
1,1 - di - (2,4,6 - trimethylphenyl) - heptahydrooxazolo[3,4-a]pyridine
1,1 - di - (2 - methyl - 4 - isopropylphenyl) - heptahydrooxazolo[3,4-a]pyridine
1,1 - di - (2-ethyl-4-[t-butylphenyl])-heptahydrooxazolo[3,4-a]pyridine Other 3-oxa-5-azabicyclo [3.1.3]nonanes of this invention which are prepared by the procedures of the above examples include:

2,2-diphenyl-7,8-diethyl-3-oxa-5-azabicyclo[3.1.3]nonane
2,2-dibenzyl-6-methyl-3-oxa-5-azabicyclo[3.1.3]nonane
2,2-diphenethyl-8-ethyl-3-oxa-5-azabicyclo[3.1.3]nonane
2-phenyl-2-p-tolyl-3-oxa-5-azabicyclo[3.1.3]nonane
2-tolyl-2-m-xylyl-3-oxa-5-azabicyclo[3.1.3]nonane
2,2-di-p-methoxyphenyl-3-oxa-5-azabicyclo[3.1.3]
2,2 - di - p - isopropoxyphenyl-3-oxa-5-azabicyclo[3.1.3]nonane
2-o-ethoxyphenyl - 2 - phenyl-3-oxa-5-azabicyclo[3.1.3]nonane
2,2 - di-p-chlorophenyl-8-methyl-3-oxa-5-azabicyclo[3.1.3]nonane
2,2-di-o-bromophenyl - 6-ethyl-3-oxa-5-azabicyclo[3.1.3]nonane
2,2-di-p-iodophenyl-3-oxa-5-azabicyclo[3.1.3]nonane
2-(2,4,6-trichlorophenyl)-2-phenyl - 3 - oxa-5-azabicyclo[3.1.3]nonane
Spiro[anthracene-9(10),2'-(3-oxa - 5 - azabicyclo[3.1.3]nonane)]

Other 3-oxa-5-azabicyclo[3.2.2]nonanes of this invention which are prepared by the procedures of the above examples include:

2,2 - diphenyl-7,8-dimethyl - 3 - oxa-5-azabicyclo[3.2.2]nonane
2,2-dibenzyl-8-ethyl-3-oxa-5-azabicyclo[3.2.2]nonane
2-phenyl-2-phenethyl-3-oxa-5-azabicyclo[3.2.2]nonane
2,2-ditolyl-6-methyl-3-oxa-5-azabicyclo[3.2.2]nonane
2,2 - di-o-methoxyphenyl-3-oxa-5-azabicyclo[3.2.2]nonane
2-p-ethoxyphenyl-2-p-isopropoxyphenyl - 3 - oxa-5-azabicyclo[3.2.2]nonane
2,2-di-o-chlorophenyl-3-oxa-5-azabicyclo[3.2.2]nonane
2,2-di-p-bromophenyl-3-oxa-5-azabicyclo[3.2.2]nonane
2,2-di-p-iodophenyl-3-oxa-5-azabicyclo[3.2.2]nonane
2-p-fluorophenyl - 2 - phenyl - 3-oxa-5-azabicyclo[3.2.2]nonane
2-(2,4,6-trichlorophenyl)-2-phenyl - 3 - oxa-5-azabicyclo[3.2.2]nonane
Spiro[anthracene-9(10),2'-(3-oxa - 5 - azabicyclo[3.2.2]nonane)]

The compounds of Examples 13, 16 and 19 exhibited the activities described for each when administered orally. The compound of Example 14 exhibited stimulant activity when administered orally and subcutaneously. The compound of Example 15 exhibited stimulant activity when administered subcutaneously. The compounds of Examples 22 to 27 exhibited depressant activity when administered intra-peritoneally.

The following examples illustrate suitable pharmaceutical compositions containing the new compounds. In these examples, the quantities are given for single units, it being understood that in actual practice, the dosage forms will be prepared in suitable quantities, and the amounts adjusted accordingly.

EXAMPLE 28

*25 mg. tablets.*—Twenty five mg. of the maleate of 2,2-di-(o-tolyl)-3-oxa-5-azabicyclo[3.2.2]nonane (Example 24), 48 mg. of powdered sugar, and 32 mg. of corn starch are mixed and granulated with 10 per cent gelatin solution. The granulation is dried and ground to fine granules for tableting. About 1 percent magnesium stearate is added as a lubricant, together with sufficient corn starch to give a weight of 2.5 grains per tablet. The product is compressed on a single punch or rotary machine using a 9/32 inch punch.

EXAMPLE 29

*500 mg. tablets.*—Five hundred mg. of the maleate of 2,2-di-(o-tolyl)-3-oxa-5-azabicyclo[3.2.2]nonane (Example 24) in finely powdered form is admixed with 60 mg. of corn starch and 100 mg. of powdered sugar and then granulated with 10 percent gelatin solution. The granulation is dried and ground to size suitable for tableting. About 1 percent magnesium stearate is added as a lubricant, together with sufficient corn starch to give a weight of 700 mg. per tablet. The product is compressed on a single punch or rotary machine using a 7/16 inch punch.

The tablets of Examples 28 and 29 can be suitably coated if desired, as, for example, with sugar.

EXAMPLE 30

*25 mg. capsule.*—Twenty-five mg. of the maleate of spiro(anthracene - 9-[10H],1'-heptahydrooxazolo[3,4-a]pyridine) (Example 19) is admixed with corn starch in quantity required to provide sufficient bulk for the desired size capsule, and the mixture is encapsulated.

EXAMPLE 31

*500 mg. capsule.*—Five hundred mg. of the maleate of 2,2-di-(o-tolyl)-3-oxa-5-azabicyclo[3.2.2]nonane (Example 24) is admixed with sufficient corn starch to give the proper bulk for the desired size capsule, and the mixture is encapsulated.

EXAMPLE 32

*Injectable suspension, 100 mg. per ml.*—The following ingredients are sterilized separately: 100 mg. of the maleate of 2,2-di-(o-tolyl)-3-oxa-5-azabicyclo[3.2.2]nonane (Example 24), 0.1 ml. of Tween 80 and q.s. corn oil to make a final volume of one ml. These ingredients are admixed aseptically. Particle size can be achieved by use of micronized material or by use of a ball mill, maintaining aseptic conditions. The above suspension can be administered subcutaneously and intramuscularly.

EXAMPLE 33

*Liquid (syrup) 25 mg. per teaspoon.*—Twenty-five mg. of the hydrochloride of 1,1-di-(2-thienyl)-heptahydrooxazolo[3,4-a]pyridine (Example 12) is dissolved in one ml. of water. Five mg. of sodium benzoate, 3.5 ml. of liquid sugar, 5 mg. of citric acid, and 0.375 of butoben are added and stirred until dissolved, using gentle heat if necessary. Flavor, as desired, and water q.s. 5 ml. are then added.

EXAMPLE 34

*Liquid (syrup) 500 mg. per tablespoon.*—Five hundred mg. of the hydrochloride of 1,1-di(2-thienyl)-heptahydrooxazolo[3,4-a]pyridine (Example 12) and 4.5 mg. of sugar are dissolved in sufficient water so that after the addition of 2.25 ml. of alcohol U.S.P. and flavor, as desired, the volume is 15 ml.

EXAMPLE 35

*Injectable solution, 100 mg. per ml.*—One hundred mg. of the hydrochloride of 1,1-di-(2-thienyl)-heptahydrooxazolo[3,4-a]pyridine (Example 12) and water for injection q.s. one ml. are mixed and warmed gently till solution is accomplished. The solution is filtered through an 03 porosity Selas filter, using sterilized equipment under aseptic conditions, and is used freshly made up for injection.

The other compounds of Examples 12 to 27 can be used to prepare pharmaceutical compositions such as those of Examples 28 to 35.

This application is a continuation-in-part of our pending application Serial No. 485,624, filed February 1, 1955, now abandoned.

We claim:

1. The compounds of the formulas selected from the group consisting of (a) 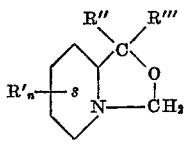

(b) 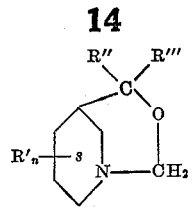

and (c) 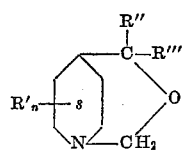

in which $s$ signifies that the rings are saturated, $n$ represents an integer from 1 to 4 inclusive, $R'$ represents a substitutent selected from the group consisting of the hydrogen atom and the methyl and ethyl radicals and $R''$ and $R'''$ represent substituents selected from the group consisting of the phenyl, phenyl lower alkyl, lower alkylphenyl, lower alkoxyphenyl, halophenyl and thienyl radicals and in which $R''$ and $R'''$ when taken together with the carbon atom to which they are attached represent 9(10)-anthranylidene.

2. 1,1-di-(2-thienyl)-heptahydrooxazolo[3,4-a]pyridine.
3. 1,1-di-(o-tolyl)-heptahydrooxazolo[3,4-a]pyridine.
4. 1,1-diphenyl-heptahydrooxazolo[3,4-a]pyridine.
5. Spiro anthracene-9(10H),1'-heptahydrooxazolo[3,4-a]pyridine.
6. 2,2-di-(o-tolyl)-3-oxa-5-azabicyclo[3.2.2]nonane.

References Cited in the file of this patent

Berichte der Deut. Chem. Gesell. (1921), vol. 54B, pp. 3012, 3019, 3020.